United States Patent
Tseng et al.

(10) Patent No.: US 7,783,373 B2
(45) Date of Patent: Aug. 24, 2010

(54) DEBUG METHOD FOR DETERMINING EXCURSIVE MACHINES IN A MANUFACTURING PROCESS

(75) Inventors: Shin-Mu Tseng, Tainan (TW); Wei-Cheng Lin, Kaohsiung (TW)

(73) Assignee: Nupoint Technology Co., Ltd., Kaohsiung (TW)

(*) Notice: Subject to any disclaimer, the term of this patent is extended or adjusted under 35 U.S.C. 154(b) by 385 days.

(21) Appl. No.: 11/934,241

(22) Filed: Nov. 2, 2007

(65) Prior Publication Data

US 2008/0167746 A1    Jul. 10, 2008

(30) Foreign Application Priority Data

Jan. 5, 2007  (TW) .............................. 96100602 A

(51) Int. Cl.
G06F 19/00 (2006.01)
G06F 11/30 (2006.01)
G01N 37/00 (2006.01)
G05B 23/02 (2006.01)

(52) U.S. Cl. .................. 700/111; 700/110; 702/84; 702/182; 702/183; 340/3.43; 340/3.44

(58) Field of Classification Search .............. 700/109, 700/110, 121, 166; 702/35, 183
See application file for complete search history.

(56) References Cited

U.S. PATENT DOCUMENTS 5,801,965 A * 9/1998 Takagi et al. ................. 702/35
6,701,204 B1 * 3/2004 Nicholson .................... 700/121
6,741,941 B2 * 5/2004 Obara et al. ................... 702/35
7,363,098 B2 * 4/2008 Ng et al. ...................... 700/110
7,424,336 B2 * 9/2008 Ono et al. ..................... 700/108

* cited by examiner

Primary Examiner—Albert DeCady
Assistant Examiner—Sivalingam Sivanesan
(74) Attorney, Agent, or Firm—Thomas, Kayden, Horstemeyer & Risley, LLP

(57) ABSTRACT

A process debug method used to identify at least one excursive machine in a manufacturing process comprising the following steps: First, a series of validity identification data is collected, and the serial validity identification data is associated with its pathway to obtain a plurality of validity identification data sequences in corresponding to the machines. Subsequently, a sorting process is conducted to cluster the validity identification data sequence into several groups, and the clustered groups are ranked into a first order. The validity identification data sequences are subjected a continuity analysis to determine the continuity of the defects occurring in a particular machine. And the continuities of the machines involved in a particular group are ranked into a second order. Accordingly, the excursive machines causing the defective end products in the manufacturing process can be identified by the way of joining the second orders according to the first order.

10 Claims, 3 Drawing Sheets

DEBUG METHOD FOR DETERMINING EXCURSIVE MACHINES IN A MANUFACTURING PROCESS

RELATED APPLICATIONS

This application claims priority to Taiwan Application Serial Number 96100602, filed Jan. 5, 2007, which is herein incorporated by reference.

FIELD OF THE INVENTION

The present invention relates to a debug method, and more specifically to a debug method for determining machine failure or workstation failure during a manufacturing process.

BACKGROUND OF THE INVENTION

Sampling and testing materials among a manufacture progress, and process simulation with dummy materials to determine machine failure or work station failure are the most common methods in quality control during a manufacturing process for products like semiconductors or thin film transistor liquid crystal display (TFT-LCD).

The sampling analysis is based on the assumptions that the manufacturing process is under static conditions, and the testing result of small samples can be representative of the real manufacturing environment as a whole.

However, the testing result of the small samples may not represent the real manufacturing environment due to imprecise sampling programs or an inappropriate tolerance acceptance levels. In this case, some potential crisis can be omitted and the broken or malfunctioning machines (hereinafter referred to as "excursive machines")/stations cannot be found until a lot of invalid products are produced, or until the yield is reduced sharply.

Alternatively, the estimation of simulation parameters may depend on an engineer's subjective judgment that may result in some subjective faults and the suspect excursive machines will not be identified in time. Furthermore, the dummy material testing may cause additional cost.

SUMMARY OF THE INVENTION

One of the disclosed embodiments provides a process debug method used to identify excursive machines in the manufacturing process so as to prevent potential failures. The process debug method comprises several steps as follows: First, a series of validity identification data of a plurality of end products is collected. Each validity identification data can determine the validity of the corresponding end product treated by a manufacturing process. Each of the serial validity identification data is associated with a plurality of machines that have been used to treat the corresponding end product during the manufacturing process, whereby each of these machines involved in the manufacturing process receives a set of validity identification data ranked by the sequence of the end products passing through the corresponding machine.

A sorting process is conducted in accordance with the main functions of these machines to cluster the validity identification data sets of these machines into several groups, and each clustered group of the validity identification data sets can output a sorting parameter by counting the numbers of machine that has at least one invalid validity identification data in its corresponding validity identification data set. A first order in representing the rank position of these clustered groups can be established in accordance with the rank of sorting parameters Subsequently, a continuity analysis is conducted on each of the validity identification data sets to output a continuity parameter. The continuity parameters of these machines that are clustered in one particular group are than ranked to obtain a second order, and the second orders of these clustered groups are then joined according to the first order. Thus the rank position of each machine involved in the manufacturing process is determined, and the excursive machines that may cause invalid end products can be identified.

Another disclosed embodiment provides a process debug system used to identify excursive machines in a manufacturing process just in time to prevent potential failures. The process debug system comprises a validity identification data-arranging module, a continuity analysis module, a sorting module and a selector.

The validity identification data-arranging module collects a series of validity identification data, one of which can determine the validity of a corresponding end product treated by a manufacture process. Subsequently, each of the validity identification data is associated with a plurality of machines that have been used to treat the corresponding end product during the manufacturing process, whereby each machine obtains a validity identification data set according to the sequence of the corresponding end products passing through it's corresponding machine.

The sorting module conducts a sorting process to cluster the validity identification data sets of these machines into several groups in accordance with the main function of these machines, and each validity identification data sets involved in one particular group outputs a sorting parameter by counting the numbers of machine that has at least one invalid validity identification data in its corresponding validity identification data set. A first order in representing the rank position of these clustered groups can be established according to the rank of the sorting parameters.

The continuity analysis module conducts continuity analysis on all the validity identification data sets clustered in one particular group and to output a continuity parameter with the corresponding machine. The continuity parameters of these machines clustered in the particular group are then ranked to obtain a second order.

The selector joins the second orders of these clustered groups according to the first order, and then identifies the excursive machines that cause the defective end products in the manufacturing process.

In accordance with the embodiments, a serial validity identification data is collected, one of which can determine whether an end product of a manufacturing process is valid or not, and the serial validity identification data is associated with a plurality of machines that treat the end product during the manufacturing process, whereby each machine obtains a validity identification data set. Subsequently, a sorting process clusters the collected validity identification data sets of these machines into several groups according to the main function of these machines, and the clustered groups are then ranked into a first order in accordance with the numbers of the machine that contributes at least one invalid end product in its corresponding validity identification data set, whereby the major group that cause the invalid end products is determine.

Meanwhile, each validity identification data set of a particular machine involved in each clustered group is subjected to a continuity analysis to determine the continuity of the invalid end products occurred in a particular machine. And the continuities of the machines involved in a particular group are ranked into a second order. Accordingly, the excursive machines causing the invalid end products in the manufacturing process can be identified by the way of joining the second orders according to the first order.

Since the embodiment needs not any sampling programs and inspections in testing dummy materials, the process debug system uses less time and operations than the conventional methods described above. Furthermore, the process situation can be inspected immediately so as to identify excursive machines quickly and to prevent doubtful machines from manufacturing large amounts of faulty products.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The foregoing aspects and many of the attendant advantages of this invention will become more readily appreciated as the same becomes better understood by reference to the following process debug method and system that are applied in a conventional semiconductor manufacturing process 100 as a preferred embodiment. As is understood by a person skilled in the art, the preferred embodiment of the present invention is illustrative rather than limiting of the present invention.

Figure 1:
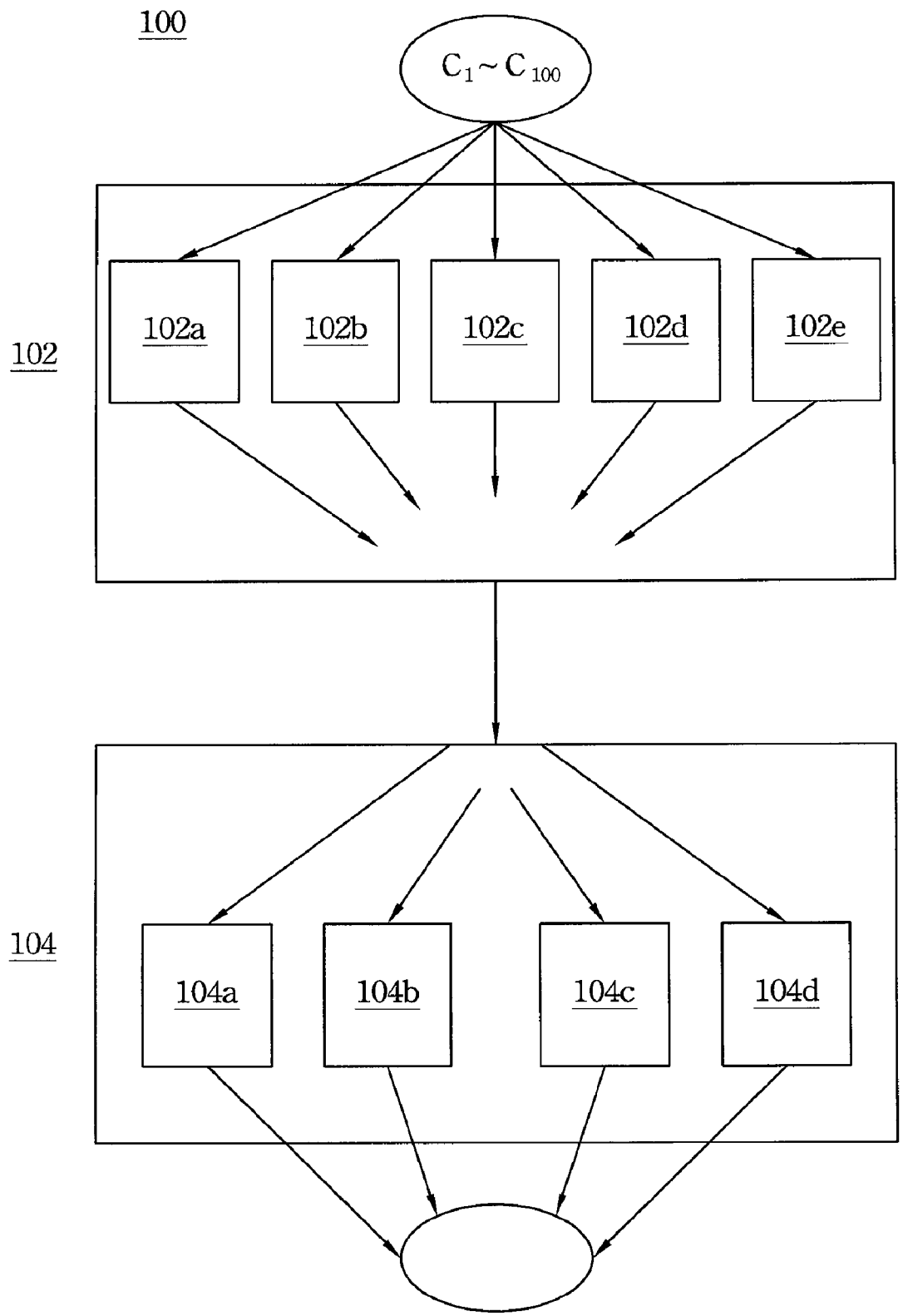
FIG. 1 is a flow diagram of a conventional semiconductor manufacturing process 100.

FIG. 1 is a flow diagram of a conventional semiconductor manufacturing process 100. The semiconductor manufacturing process 100 comprises an ion implanting step 102 and a thermal annealing step 104. Wherein the ion implanting step 102 is implemented by a plurality of implanting machines, such as the implanting machines 102a, 102b, 102c, 102d and 102e; and the thermal annealing step 104 is implemented by a plurality of thermal annealing machines, such as thermal annealing machines 104a, 104b, 104c and 104d. Pluralities of semiconductor wafers are given identification numbers (ID numbers) from $C_1$ to $C_{100}$ and are subsequently inputted into the semiconductor manufacturing process 100. Each of these semiconductor wafers with ID numbers from $C_1$ to $C_{100}$ is subjected to the ion implanting step 102 via passing through one of the implanting machines 102a, 102b, 102c, 102d and 102e and then is subjected to the thermal annealing step 104 via passing through one of the thermal annealing machines 104a, 104b, 104c and 104d. For example, each of the semiconductor wafers (with ID number from $C_1$ to $C_{100}$) is treated by one of the ion implanting machines 102a, 102b, 102c, 102d and 102e, and then passes through one of the thermal annealing machines 104a, 104b, 104c and 104d. Thus each of the semiconductor wafers from $C_1$ to $C_{100}$ has 5×4 alternative pathways for implementing the semiconductor manufacturing process 100. Each alternative pathway is selected randomly depending on the processing situation.

When the semiconductor wafers (ID number from $C_1$ to $C_{100}$) have implemented the semiconductor manufacturing process 100, each of the semiconductor wafers (ID number from $C_1$ to $C_{100}$) should be treated by one of the implanting machines (102a, 102b, 102c, 102 and 102e) and one of the thermal annealing machines (104a, 104b, 104c and 104d). The first column of table 1 lists the steps that the wafers should be subjected to; the second column of the table 1 lists all machines of the semiconductor manufacturing process 100; and the column 3 of the table 1 lists the semiconductor wafers that have been treated by the corresponding machines. In table 1, each machine has a set of ID numbers corresponding to the semiconductor wafers that have been treated by the machine; and the set of ID numbers are ranked in the order of the semiconductor wafers passing through the corresponding machine.

TABLE 1

| Steps | Machine | Wafers |
|---|---|---|
| 102 | 102a | $C_1, C_8, C_{11}, C_{17}, C_{25}, C_{29}, C_{35}, C_{40}, C_{41}, C_{46}, C_{50}, C_{56}, C_{60}, C_{66}, C_{73}, C_{77}, C_{80}, C_{85}, C_{95}, C_{100}$ |
| 102 | 102b | $C_2, C_{10}, C_{15}, C_{16}, C_{21}, C_{30}, C_{34}, C_{38}, C_{42}, C_{48}, C_{51}, C_{61}, C_{65}, C_{67}, C_{74}, C_{78}, C_{81}, C_{87}, C_{92}, C_{97}$ |
| 102 | 102c | $C_3, C_9, C_{12}, C_{18}, C_{22}, C_{26}, C_{33}, C_{37}, C_{43}, C_{52}, C_{55}, C_{57}, C_{62}, C_{69}, C_{72}, C_{76}, C_{84}, C_{91}, C_{96}, C_{99}$ |
| 102 | 102d | $C_4, C_6, C_{14}, C_{20}, C_{23}, C_{28}, C_{32}, C_{36}, C_{45}, C_{47}, C_{53}, C_{58}, C_{63}, C_{68}, C_{71}, C_{79}, C_{83}, C_{89}, C_{93}, C_{98}$ |
| 102 | 102e | $C_5, C_7, C_{13}, C_{19}, C_{24}, C_{27}, C_{31}, C_{39}, C_{44}, C_{47}, C_{54}, C_{59}, C_{64}, C_{70}, C_{75}, C_{82}, C_{86}, C_{88}, C_{94}, C_{97}$ |
| 104 | 104a | $C_1, C_5, C_8, C_{11}, C_{17}, C_{25}, C_{27}, C_{28}, C_{34}, C_{37}, C_{41}, C_{45}, C_{51}, C_{58}, C_{59}, C_{69}, C_{70}, C_{73}, C_{77}, C_{80}, C_{85}, C_{88}, C_{90}, C_{95}, C_{100}$ |
| 104 | 104b | $C_2, C_7, C_{10}, C_{13}, C_{15}, C_{16}, C_{21}, C_{24}, C_{30}, C_{35}, C_{38}, C_{42}, C_{44}, C_{48}, C_{50}, C_{61}, C_{65}, C_{67}, C_{74}, C_{78}, C_{81}, C_{87}, C_{92}, C_{94}, C_{97}$ |
| 104 | 104c | $C_3, C_9, C_{12}, C_{18}, C_{19}, C_{22}, C_{26}, C_{31}, C_{33}, C_{40}, C_{43}, C_{47}, C_{52}, C_{55}, C_{57}, C_{60}, C_{62}, C_{64}, C_{66}, C_{72}, C_{76}, C_{82}, C_{84}, C_{91}, C_{98}$ |
| 104 | 104d | $C_4, C_6, C_{14}, C_{20}, C_{23}, C_{29}, C_{32}, C_{36}, C_{39}, C_{46}, C_{47}, C_{53}, C_{54}, C_{56}, C_{63}, C_{68}, C_{71}, C_{75}, C_{79}, C_{83}, C_{86}, C_{89}, C_{93}, C_{96}, C_{99}$ |

Table 1 can be regarded as a historical reference or pathway pertaining to these semiconductor wafers passing through the semiconductor process 100. Accordingly, the pathway including the treating machine and its treating sequence pertaining to a particular semiconductor wafer can be found on the Table 1. For example, in accordance with table 1, the semiconductor wafer $C_{10}$ can be associated with the ion implanting machine 102b and the thermal annealing machine 104b. This means that the semiconductor wafer $C_{10}$ has been treated by the ion implanting machine 102a in the order of No. 2 and has been treated by the thermal annealing machine 104b in the order of No. 3 during the semiconductor manufacturing process 100.

In order to inspect the process situation immediately and identify excursive machines quickly to prevent mass defective wafers, a process debug system 200 and its application method are applied in the semiconductor manufacturing process 100.

Figure 2:
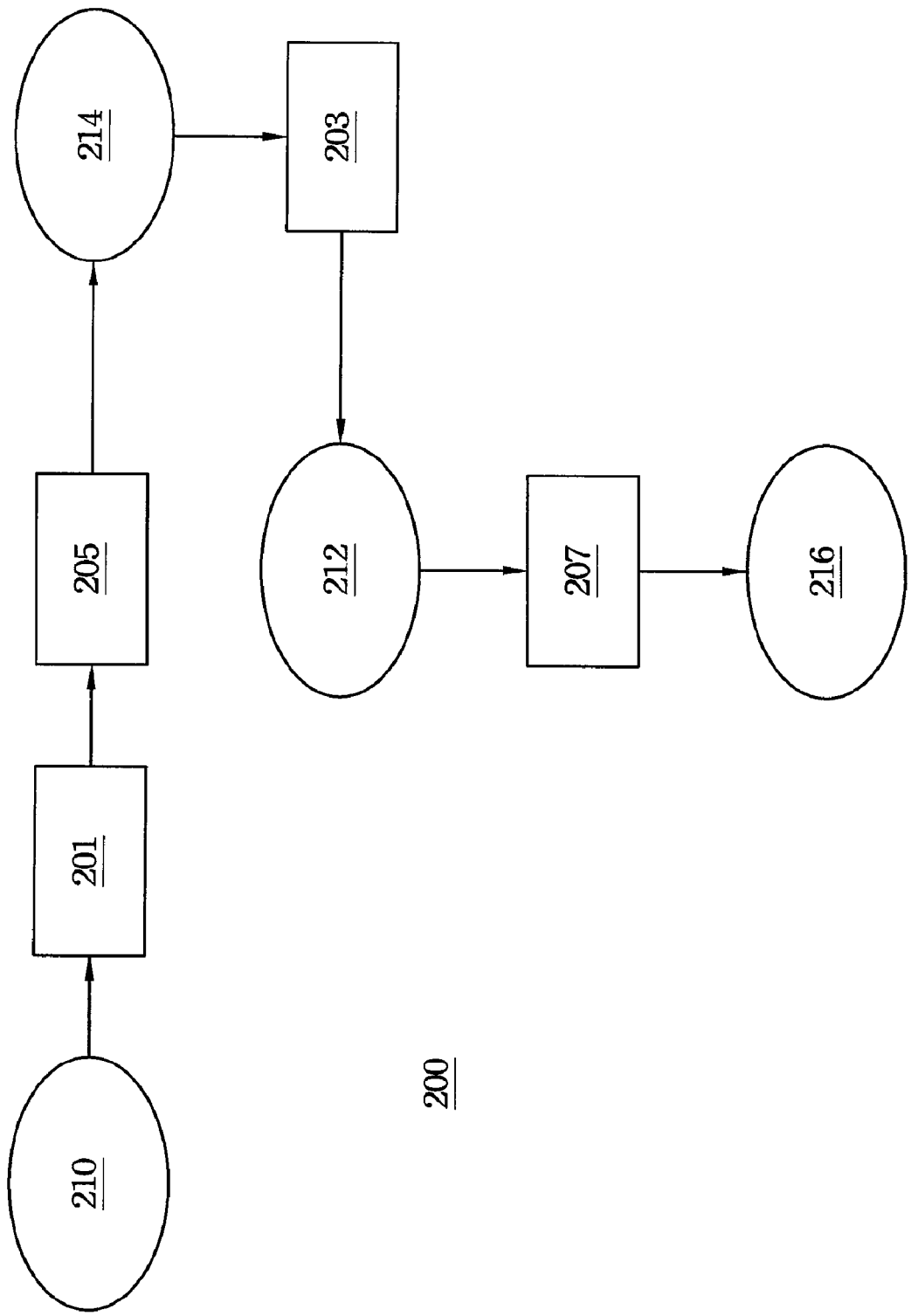
FIG. 2 illustrates a process debug system 200 in accordance with an embodiment of the present invention.

FIG. 2 illustrates a process debug system 200 in accordance with an embodiment of the present invention, wherein the process debug system 200 comprises a validity identification data-arranging module 201, a continuity analysis module 203, a sorting module 205 and a selector 207.

Figure 3:
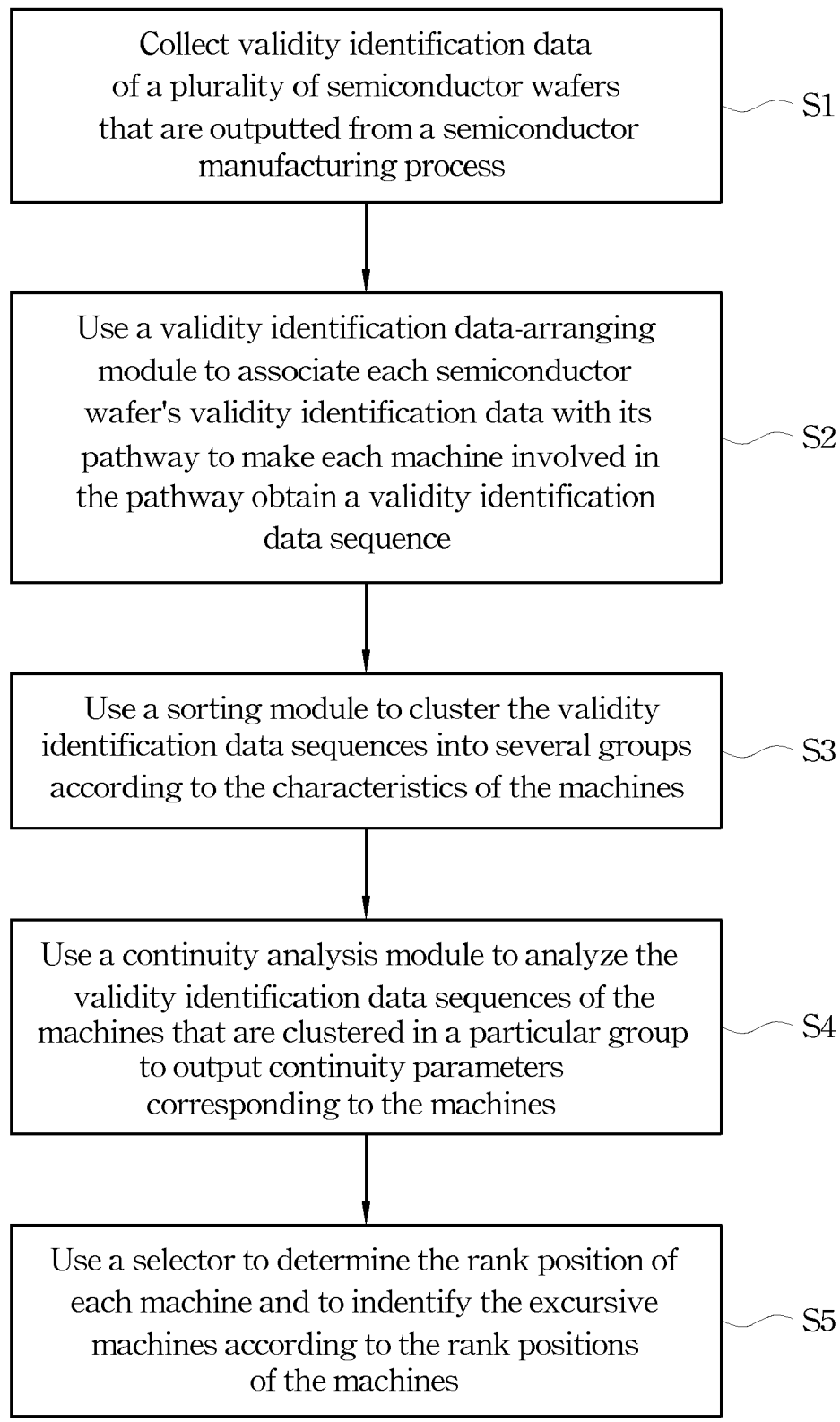
FIG. 3 illustrates a diagram of a process debug method in accordance with an embodiment of the present invention.

FIG. 3 illustrates a diagram of a process debug method in accordance with an embodiment of the present invention, wherein the process debug method comprises several steps as following: First, validity identification data 210 of a plurality of semiconductor wafers that have ID numbers from $C_1$ to $C_{100}$ according to the sequence outputted from the semiconductor process 100 are collected. Each of the semiconductor wafers having a validity identification data 210 is used to identify the validity of the semiconductor wafer outputted from the semiconductor process 100. In some embodiments of the present invention, a validity identification data 210 is represented by a score to identify whether a semiconductor wafer is valid or not. For example the score of "1" represents that a semiconductor wafer outputted from the semiconductor process 100 is invalid, and the score of "0" represents a semiconductor wafer outputted from the semiconductor process 100 is a valid end product (refer to the step S1).

Subsequently, referring to step S2, a validity identification data-arranging module 201 associates the validity identification data 210 on each semiconductor wafer with its pathway (see table 1) to establish the table 2, whereby each machine involved in one of these pathways can obtain a validity identification data sequence with the scores of "0" or "1".

TABLE 2

| Steps | Machine | Validity of Wafers |
|---|---|---|
| 102 | 102a | 0, 0, 1, 1, 1, 1, 1, 1, 1, 1, 1, 1, 1, 1, 1, 0, 0, 0, 0, 0 |
| 102 | 102b | 0, 0, 0, 0, 0, 0, 0, 0, 0, 0, 0, 0, 0, 0, 0, 0, 0, 0, 0, 0 |
| 102 | 102c | 0, 0, 0, 0, 0, 0, 0, 0, 0, 0, 0, 0, 0, 0, 0, 0, 0, 0, 0, 0 |
| 102 | 102d | 0, 0, 0, 0, 0, 0, 0, 1, 0, 0, 0, 0, 0, 0, 0, 0, 0, 0, 0, 0 |
| 102 | 102e | 0, 0, 0, 0, 0, 0, 0, 0, 0, 0, 0, 0, 0, 0, 0, 0, 0, 0, 0, 0 |
| 104 | 104a | 0, 0, 0, 1, 1, 1, 0, 0, 0, 0, 1, 0, 0, 0, 0, 0, 1, 0, 0, 0, 0, 0, 0, 0 |
| 104 | 104b | 0, 0, 0, 0, 0, 0, 0, 0, 0, 1, 0, 0, 0, 0, 1, 0, 0, 0, 0, 0, 0, 0, 0, 0 |
| 104 | 104c | 0, 0, 0, 0, 0, 0, 0, 0, 0, 1, 0, 0, 0, 0, 0, 1, 0, 0, 1, 0, 0, 0, 0, 0 |
| 104 | 104d | 0, 0, 0, 0, 0, 1, 0, 0, 0, 1, 0, 0, 0, 1, 0, 0, 0, 0, 0, 0, 0, 0, 0, 0 |

Fore example, there are 85 valid products (marked as 0) and 15 invalid products (marked as 1) outputted from the semiconductor manufacturing process 100, in accordance with the collected validity identification data 210 of each semiconductor wafers. Each validity identification data of 210 is then associated with its corresponding ID numbers set forth in the table 1, so as to establish the table 2. Wherein a semiconductor wafers that result in a valid end product is marked by the score of "0"; and the semiconductor wafers that result in invalid end products, such as $C_{11}$, $C_{17}$, $C_{25}$, $C_{29}$, $C_{35}$, $C_{36}$, $C_{40}$, $C_{41}$, $C_{46}$, $C_{50}$, $C_{56}$, $C_{60}$, $C_{66}$ and $C_{73}$ are marked by the score of "1". Accordingly, each machine has a set of validity identification data 210 corresponding to the semiconductor wafers that have been treated by the machine.

A sorting module 205 is then used to cluster the machines listed on the table 2 into several groups according to the main functions of the machines (see step S3). For example, the machines of the table 2 can be clustered into two groups, wherein one group is the implanting machines 102a, 102b, 102c, 102 and 102e, and the other group is the thermal annealing machines 104a, 104b, 104c and 104d. Meanwhile, the validity identification data sets of these machines are also clustered into several groups.

A sorting parameter 214 of each group can be output by the way of counting the numbers of the machine that contributes the invalid validity identification data in the same group. In the present embodiment, the sorting parameter 214 of a particular group can be accounted as 1/M, wherein M is the number of machines that have at least one invalid validity identification data in its corresponding validity identification data set. For example, since two (machines of 102a and 102d) of the implanting machines group (machines 102a, 102b, 102c, 102d and 102e) attributing the invalid validity identification data set have at least one invalid end product, the sorting parameter 214 of the implanting machines group consisting of machines 102a, 102b, 102c, 102d and 102e can account as 1/2 equivalent to 0.5.

In the other group of the thermal annealing machines 104a, 104b, 104c and 104d, all of the four machines attribute at least one invalid validity identification data, accordingly the sorting parameter 214 of the thermal annealing machines group consisting of machines 104a, 104b, 104c and 104d can account as 1/4 equivalent to 0.25.

Consequently, a first order of the groups can be established according to the ranking position of the sorting parameters 214. In the present embodiment the sorting parameter 214 of the implanting machines group is greater than the sorting parameter of the thermal annealing machines group. This means that the implanting machines group has the higher probability to be the excursive step that results in the invalid or invalid end products than that of the thermal annealing machines group.

In addition, data noise of the validity identification data 210 may occur due to the personal or testing error. To resolve these problems, the step of collecting the validity identification data 210 comprises a noise filtering process to discard the noise data. The noise filtering process comprises the following steps: first a criterion for discarding the validity identification data 210 with no representation is provided, and then the validity identification data 210 that do not fit the criterion should be discarded.

An explanatory criterion for discarding the validity identification data 210 is described as follows: In the present embodiment, the invalid validity identification data that are scored as "1" in a particular clustered group is the major source of data noise, thus numbers of the invalid validity identification data should be discarded from the particular clustered group during the noise filter process. Wherein the numbers of the invalid validity identification data N that should be discarded is determined on the total numbers of the invalid validity identification data B occurs in a particular clustered group. Table 3 lists an explanatory relationship (criteria) between B and N for discarding the invalid validity identification data:

TABLE 3

| The Total Numbers of the Invalid Validity identification Data (B) with in a clustered group | Numbers (N) of the Invalid Validity identification Data that should be discarded |
|---|---|
| 0 < B < 6 | N = 0 |
| 6 ≦ B < 12 | N = 1 |
| 12 ≦ B < 30 | N = 2 |

In accordance with table 3, invalid validity identification data is scored as "1." When there are less than six "1" scores in a particular clustered group, none of the "1" scores should be discarded from the corresponding group. When there are more than six and less than twelve "1" scores in a particular clustered group, only one of the "1" scores should be discarded from the corresponding group. When there are more than twelve "1" scores in a particular clustered group B, two of the "1" scores should be discarded from the corresponding group.

When there are multiple invalid validity identification data that should be discarded from the particular clustered group, each machine that has at least one invalid validity identification data should contribute at least one score "1" to be discarded. One principle of the rule for discarding the invalid validity identification data is sum up as follows: when the number N of the invalid validity identification data that should be discarded is less than or equal to the number of machines that has at least one invalid validity identification data, the machine that has the most numbers of invalid validity identification data should be first excluded from the data-discarding step.

For instance, there are fourteen "1" scores in the implanting machines group that involves machines 102a, 102b, 102c, 102d and 102e. According to Table 3, two "1" scores should be discarded from the implanting machines group. In accordance with the rule for discard discarding the validity identification data 210, machines 102a and 102d each of which has at least one "1" score should contribute at least one "1" score respectively. However, since there are only two "1" scores that should be discarded and the number of the machines (102a and 102d) that have at least one "1" score is equal to two, the machine 102a that has thirteen "1" scores should be first excluded from data-discarding step to contribute any "1" scores to be discarded.

In the present embodiment, since the machine 102d has only one "1" score, when the machines 102a contributes one of the "1" scores to be discarded, the machine 102d retains no invalid validity identification data ("1" score) any more. Consequently, the machine 102a is available in contributing the other "1" scores to be discarded. Meanwhile, the only machine that has invalid validity identification data (score "1") in the implanting machines group is the machine 102a. Therefore, the sorting parameter of the implanting machines group should be accounted as 1/1 rather than 1/2 after the noise filtering process.

Discarding invalid validity identification data from different machine may result in different sorting parameter. For example, the group of thermal annealing machines 104a, 104b, 104c and 104d has fourteen invalid validity identification data scored as "1", the total number B of "1" scores is greater than 12. According to Table 3, two "1" scores should be discarded. Since there are only two "1" scores should be discarded, and the number of the machines that have at least one "1" score is greater then two, the machine 104a that has five "1" scores should be excluded from data-discarding step to contribute any "1" scores to be discarded.

In accordance with the Table 2, the machine 104b has two "1" scores; machine 104c and machine 104d have three "1" scores respectively. After the machine 104a is excluded from data discarding step, the numbers of the machine that can contribute at least one "1" score is greater than that should be discarded. Two situations may occur. In one case, when the machine 104b contributes the two "1" score that should be discarded, three machines (machines 104a, 104c and 104d) retain at least one "1" score. The sorting parameter of the thermal annealing machine group should be accounted as 1/3 rather than 1/4 after the noise filtering process. In the other case, when the machine 104b contributes one of the two "1" scores that should be discarded, and the machine 104c attributes the other. Four machines (machines 104a, 104b, 104c and 104d) still have at least one "1" score. The sorting parameter of the thermal annealing machine group should be accounted still as 1/4 after the noise filtering process. In present embodiment, the situation that results in greater sorting parameter is preferable during the noise filtering process.

Subsequently, referring to step S4, a continuity analysis module 203 analyzes all the validity identification data sets of the machines and outputs a continuity parameter 212 corresponding to the machines involved in one particular group. In the present invention, the continuity parameter 212 of a machine is calculated by estimating the continuity between two arbitrary adjacent scores listed in the same validity identification data set. First, mean values of each two adjacent scores listed in a validity identification data set are calculated, then each integer of the mean value is added together to output a continuity parameter 212 corresponding to a particular machine involved in the particular group.

For example, when two adjacent scores listed in a particular validity identification data set are "1" and "1", the mean value of the two adjacent scores is 1; and the integer of the mean value used to attribute the continuity parameter 212 is 1. When one of two adjacent scores listed in a particular validity identification data set are respectively "1" and "0", the mean value of the two adjacent scores is 0.5; and the integer of the mean value used to attribute the continuity parameter 212 is 0. After all integers of the mean values calculated from two arbitrary adjacent scores listed in the particular validity identification data set are added together, the continuity parameter 212 of a particular machine involved in the particular group is determined.

In some embodiments of the present invention, the machine that has the validity identification data set with greater amount of the adding integer has the greater continuity parameter 212. However, in some embodiments of the present invention, the amount of the adding integer should be further with reference to an adding amount/continuity parameter reference to determine the continuity parameter 212 corresponding to the adding amount of the integers.

In other embodiments of the present invention, the continuity parameter 212 of a particular machine involved in the particular group can be obtained by certain continuity calculation functions. We propose four continuity calculation functions:

Function 1:

The continuity parameter 212 can be obtained from the following formula:

$$C_1 = \sum_{i=1}^{length(p)-1} s_1(a_i, a_{i+1})$$

where p is the validity identification data sequence with the scores of "0" or "1" and $a_m$ denotes the m-th score of the validity identification data sequence, and $s_1(a_i, a_j) = 1$ if $a_i = a_j = 1$ $s_1(a_i, a_j) = 0$ otherwise Function 2:
Another calculation functions are shown as follows:

$$C_2 = 1 - \frac{\sum_{i=1}^{length(p)-1} s_2(a_i, a_{i+1})}{length(p) - 1}$$

where p is the validity identification data sequence with the scores of "0" or "1" and $a_m$ denotes the m-th score of the validity identification data sequence, and Function 3:

$$s_2(a_i, a_j) = 1 \quad \text{if } a_i \neq a_j$$
$$s_2(a_i, a_j) = 0 \quad \text{otherwise}$$

$$C_3 = 1 - \frac{\sum_{i=1}^{length(p)-n} s_3(a, i, n)}{length(p) - n}$$

where p is the validity identification data sequence with the scores of "0" or "1" and $a_m$ denotes the m-th score of the validity identification data sequence, and Function 4:

$$s_3(a, i, n) = \left\lfloor \frac{\sum_{j=i}^{i+n-1} a_j}{n - i + 1} \right\rfloor$$

$$C_4 = \frac{\sum_{i=1}^{length(p)-1} s_4(a_i, a_{i+1})}{length(p) - 1}$$

where p is the validity identification data sequence with the scores of "0" or "1" and $a_m$ denotes the m-th score of the validity identification data sequence, and $$s_4(a_i, a_j) = 1 \text{ if } a_i = a_j$$

$$s_4(a_i, a_j) = -5 \text{ if } a_i \neq a_j$$

where the values, 1 and −5 can be any suitable real numbers. The value pair shown here is just an example.

The machines clustered in the particular group are then ranked to obtain a second order corresponding to the continuity parameters 212.

Referring to step S5, the selector 207 joins the second order of the clustered groups according to the first order, whereby each machine involved in the semiconductor manufacturing process 100 has a ranking position 216. In accordance with the ranking position, the major machines that cause the invalid end products can be identified. In the present invention, the machine occupying lower ranking position should be the major machine causes the invalid end products during the semiconductor manufacturing process 100.

Using the present process debug system, the processing situation of the semiconductor manufacturing process 100 can be inspected immediately, and the excursive machines can be identified in time. Furthermore, some doubtful machines can be predicted prior a lot of defectives occur.

In accordance with the embodiments, a series of validity identification data is collected, one of which can determine whether an end product of a manufacturing process is valid or not, and the serial validity identification data is associated with a plurality of machines that are used to treat the end product during the manufacturing process, whereby each machine obtains a validity identification data set. Subsequently, a sorting process is conducted to cluster the collected validity identification data sets of these machines into several groups according to the main function of these machines, and the clustered groups are then ranked into a first order in accordance the numbers of the machine that attributes at least one invalid end product in its corresponding validity identification data set to determine the major group that cause the invalid end products.

Meanwhile, each validity identification data set of a particular machine involved in each clustered group is subjected a continuity analysis to determine the continuity of the invalid end products occurred in a particular machine. And the continuities of the machines involved in a particular group are ranked into a second order. Accordingly, the broken or malfunctioning machines causing the invalid end products in the manufacturing process can be identified by the way of joining the second orders according to the first order.

Since the embodiment does not need any sampling programs and inspections in testing dummy materials, the process debug system costs less time and operations than the conventional methods described above. Furthermore, the process situation can be inspected immediately so as to identify excursive machines quickly and to prevent product doubtful machines resulting in mass defectives.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A process debug method used to identify at least one excursive machine in a manufacturing process comprising:

providing a plurality of machines used in a manufacturing process treating a plurality of end products, wherein each of the end products is treated in at least one of the machines;

collecting a plurality of validity identification data one-to-one corresponding to the end products for determining if the end products are valid after the manufacturing process is performed, wherein each of the validity identification data has a score, and the end product corresponding thereto is invalid when the score is equal to a first determined value, and the end product corresponding thereto is valid when the score is equal to a second determined value;

arranging the validity identification data of the end products for each of the machines in accordance with a sequence of the end products passing through the machine, thereby obtaining a validity identification data sequence for each of the machines;

conducting a sorting process to cluster the machines into a plurality of groups in accordance with main functions of the machines;

counting a number of the machines having at least one score which is equal to the first determined value in each of the groups, thereby obtaining a sorting parameter of each of the groups, wherein the sorting parameter indicates which group has the machines with a higher probability to result in invalid end products;

conducting a continuity analysis on every two adjacent validity identification data in each of the validity identification data sequences in each of the groups, thereby outputting a continuity parameter for each of the machines; and identifying at least one excursive machine from the machines by ranking the sorting parameter of each of the groups and/or by ranking the continuity parameter of each of the machines.

2. The process debug method in accordance with claim 1, wherein the first determined value is "1", and the second determined value is "0".

3. The process debug method in accordance with claim 1, wherein the continuity analysis comprises:

estimating the continuity between the every two adjacent validity identification data in each of the validity identification data sequences in each of the groups, thereby outputting a plurality of indicators;

adding up the indicators for each of the machines, thereby outputting the continuity parameter of each of the machines; and ranking the continuity parameters of the validity identification data sequences.

4. The process debug method in accordance with claim 3, wherein the indicators are obtained by calculating a mean value the every two adjacent validity identification data sets and by rounding down the mean value to an integer.

5. The process debug method in accordance with claim 1, wherein the continuity parameter is obtained from the following formula:

$$C_1 = \sum_{i=1}^{length(p)-1} s_1(a_i, a_{i+1})$$

where p is the validity identification data sequence with the scores of "0" or "1"

and $a_m$ denotes the m-th score of the validity identification data sequence, and $s_1(a_i, a_j) = 1$ if $a_i = a_j = 1$ $s_1(a_i, a_j) = 0$ otherwise.

6. The process debug method in accordance with claim 1, wherein the continuity parameter is obtained from the following formula:

$$C_2 = 1 - \frac{\sum_{i=1}^{length(p)-1} s_2(a_i, a_{i+1})}{length(p)-1}$$

where p is the validity identification data sequence with the scores of "0" or "1"

and $a_m$ denotes the m-th score of the validity identification data sequence, and $s_2(a_i, a_j) = 1$ if $a_i \neq a_j$ $s_2(a_i, a_j) = 0$ otherwise.

7. The process debug method in accordance with claim 1, wherein the continuity parameter obtained from the following formula:

$$C_3 = 1 - \frac{\sum_{i=1}^{length(p)-n} s_3(a, i, n)}{length(p)-n}$$

where p is the validity identification data sequence with the scores of "0" or "1"

and $a_m$ denotes the m-th score of the validity identification data sequence, and $$s_3(a, i, n) = \left\lfloor \frac{\sum_{j=i}^{i+n-1} a_j}{n-i-1} \right\rfloor.$$

8. The process debug method in accordance with claim 1, wherein the continuity parameter is obtained from the following formula:

$$C_4 = \frac{\sum_{i=1}^{length(p)-1} s_4(a_i, a_{i+1})}{length(p)-1}$$

where p is the validity identification data sequence with the scores of "0" or "1"

and $a_m$ denotes the m-th score of the validity identification data sequence, and $s_4(a_i, a_j) = 1$ if $a_i = a_j$ $s_4(a_i, a_j) = -5$ if $a_i \neq a_j$.

9. The process debug method in accordance with claim 1, further comprising;

a noise filtering process performed prior the sorting process to discard the validity identification data with no representation.

10. The process debug method in accordance with claim 9, wherein the noise filtering process comprises:

providing a criterion for discarding the validity identification data with no representation; and discarding the validity identification data that is not fit with the criteria.

* * * * *